F. B. HALL.
CABLE HANGER.
APPLICATION FILED JULY 14, 1911.

1,058,364.

Patented Apr. 8, 1913.

Witnesses:
Leonard W. Novander.
Robert F. Bracke.

Inventor
Frank B. Hall
By Brown & Williams
Attorneys

UNITED STATES PATENT OFFICE.

FRANK B. HALL, OF NEWTON FALLS, OHIO.

CABLE-HANGER.

1,058,364.      Specification of Letters Patent.      Patented Apr. 8, 1913.

Application filed July 14, 1911. Serial No. 638,589.

*To all whom it may concern:*

Be it known that I, FRANK B. HALL, a citizen of the United States, residing at Newton Falls, in the county of Trumbull and State of Ohio, have invented a certain new and useful Improvement in Cable-Hangers, of which the following is a full, clear, concise, and exact description, reference being had to the accompanying drawings, forming a part of this specification.

My invention relates to devices for suspending wires and cables from their messenger or supporting wires. These cables, such as are used for telephone and telegraph circuits, are incapable, owing to their weight, of supporting themselves when suspended from poles spaced apart at the usual intervals.

It is the object of my invention to provide a generally improved device, one which may be easily applied to the supporting and supported parts, which is strong and durable, and which is not subject to disarrangement or displacement.

The device of my invention comprises a yoke or saddle member which rides upon the messenger or supporting wire, and a strand of wire or cord which is wound about the cable and which is hooked upon the yoke or saddle in a distinctive manner. This strand is conveniently and preferably of marline and my invention might be generally classed with "marline cable hangers."

My invention is illustrated in the accompanying drawings, in which—

Figure 1:
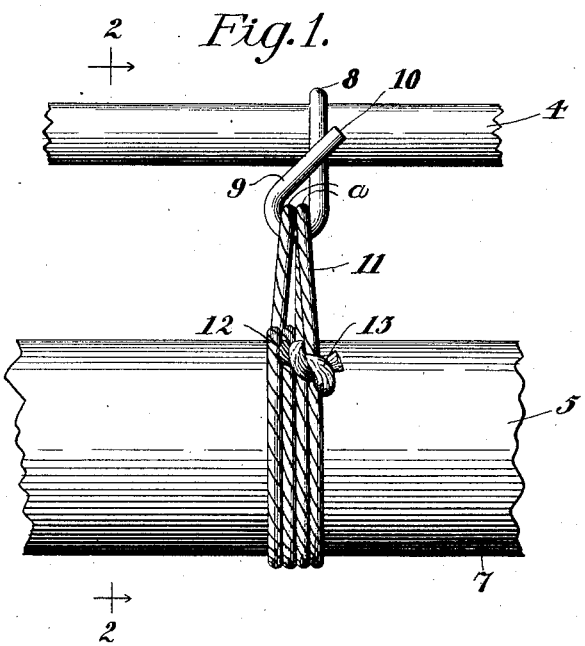
Figure 2:
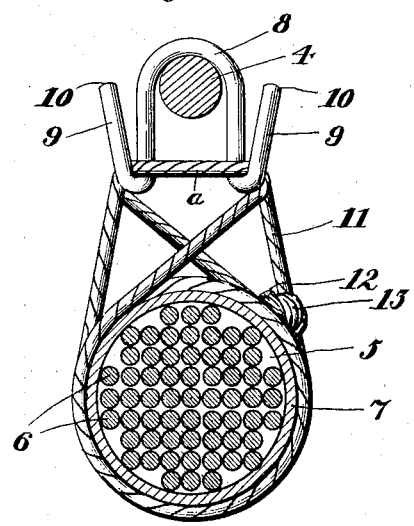

Figure 1 shows a section of messenger wire and a section of cable supported thereby; and Fig. 2 is a cross-sectional view taken on the plane of the line 2—2 of Fig. 1 and looking in the direction indicated by the arrows.

The messenger wire is indicated at 4 and the cable is shown at 5. The cable comprises a plurality of electrical conductors 6, 6, suitably insulated from each other, and a sheath 7. Riding upon the messenger wire 4 is a yoke or saddle 8, the ends of which are turned upwardly to form the hooks 9, 9. It will be noted that the ends 10, 10 of these hooked portions are above the under side of the messenger wire 4; the purpose of this will be pointed out presently. The turned-up members are also turned back across the plane of the main part of the yoke as indicated in Fig. 1, so that the marline supported in the hooks, as will be described presently, may be guarded. The marline is shown at 11. Commencing with the end 12 of the marline, it will be seen that it is wound about the cable twice, is then carried up to the left hand hook (Fig. 2), then transversely across to and over the other hook, thus passing under the messenger wire, then back to the same side of the cable from which it came, then twice around the cable in the opposite direction, then up to the left hand hook again, then across to the right hand hook and back to the beginning where the knot 13 is formed. In this way, the marline pulls equally on both sides of the yoke or saddle and the fact that parts of the marline span the yoke under the messenger wire makes it impossible for any displacements to occur. Since the ends 10, 10 of the hooks 9, 9 are above the under side of the messenger 4, the part or parts *a* of the marline would strike the under side of the messenger and be retained in place, if the cable 5 and messenger 4 were made to approach each other, before there could be any possibility of the marline passing over the ends of the hooks.

I claim as new and desire to secure by Letters Patent:

In combination, a messenger wire, an inverted U-shaped wire yoke saddled upon said messenger wire, and a wire hook integral with and extending from each end of said yoke at a point below the horizontal plane through the under side of the messenger wire, said hooks extending forwardly and then upwardly, outwardly and rearwardly to intersect the plane of the yoke and extending above the horizontal plane through the under side of the messenger wire, said hooks being thus adapted to carry a cable supporting cord extending taut and straight across therebetween and under the messenger wire.

In witness whereof, I hereunto subscribe my name this 29th day of June, A. D., 1911.

FRANK B. HALL.

Witnesses:
C. A. HUNTER,
CHAS. K. DOUGLASS.

Copies of this patent may be obtained for five cents each, by addressing the "Commissioner of Patents, Washington, D. C."